(12) United States Patent
Fujiwara

(10) Patent No.: US 9,716,801 B2
(45) Date of Patent: Jul. 25, 2017

(54) INFORMATION PROCESSING DEVICE EDITING MAP ACQUIRED FROM SERVER

(71) Applicant: BROTHER KOGYO KABUSHIKI KAISHA, Nagoya, Aichi (JP)

(72) Inventor: Susumu Fujiwara, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/990,923

(22) Filed: Jan. 8, 2016

(65) Prior Publication Data

US 2016/0205269 A1     Jul. 14, 2016

(30) Foreign Application Priority Data

Jan. 9, 2015   (JP) .................. 2015-003562

(51) Int. Cl.
*G06K 15/02* (2006.01)
*H04N 1/00* (2006.01)

(52) U.S. Cl.
CPC ....... *H04N 1/0044* (2013.01); *H04N 1/00244* (2013.01); *H04N 1/00315* (2013.01); *H04N 1/00469* (2013.01)

(58) Field of Classification Search
None
See application file for complete search history.

(56) References Cited

U.S. PATENT DOCUMENTS

2011/0293199 A1*  12/2011  Itakura .................. G06F 3/1205
                                                                           382/293
2012/0165069 A1*   6/2012  Jung .................. G01C 21/3664
                                                                          455/556.1
2014/0118754 A1*   5/2014  Nakamoto ............ G06F 3/1208
                                                                                358/1.2

FOREIGN PATENT DOCUMENTS

| JP | 2001-007925 A | 1/2001 |
| JP | 2001-175662 A | 6/2001 |
| JP | 2002-036638 A | 2/2002 |
| JP | 2003-084664 A | 3/2003 |
| JP | 2003-131562 A | 5/2003 |

OTHER PUBLICATIONS

Corresponds to U.S. Appl. No. 14/990,87,9 filed Jan. 8, 2016.
Official Action dated Nov. 30, 2016 in a related application, namely, U.S. Appl. No. 14/990,923, filed Jan. 8, 2016.

\* cited by examiner

*Primary Examiner* — Henok A Shiferaw
(74) *Attorney, Agent, or Firm* — Scully, Scott, Murphy & Presser, PC

(57) ABSTRACT

An information processing device includes a display; a communication interface; and a controller. The controller is configured to perform: acquiring first map data from a server through the communication interface, the first map data being indicative of a first map image, a first zoom level indicating a first scale of the first map image; displaying the first map image based on the first map data on the display; setting a print area to the first map image; determining a second zoom level on the basis of the first zoom level, the second zoom level indicating a second scale of a second map image, the second map image including at least the print area in the first map image; and acquiring second map data from the server through the communication interface, the second map data being indicative of the second map image.

21 Claims, 7 Drawing Sheets

FIG. 2
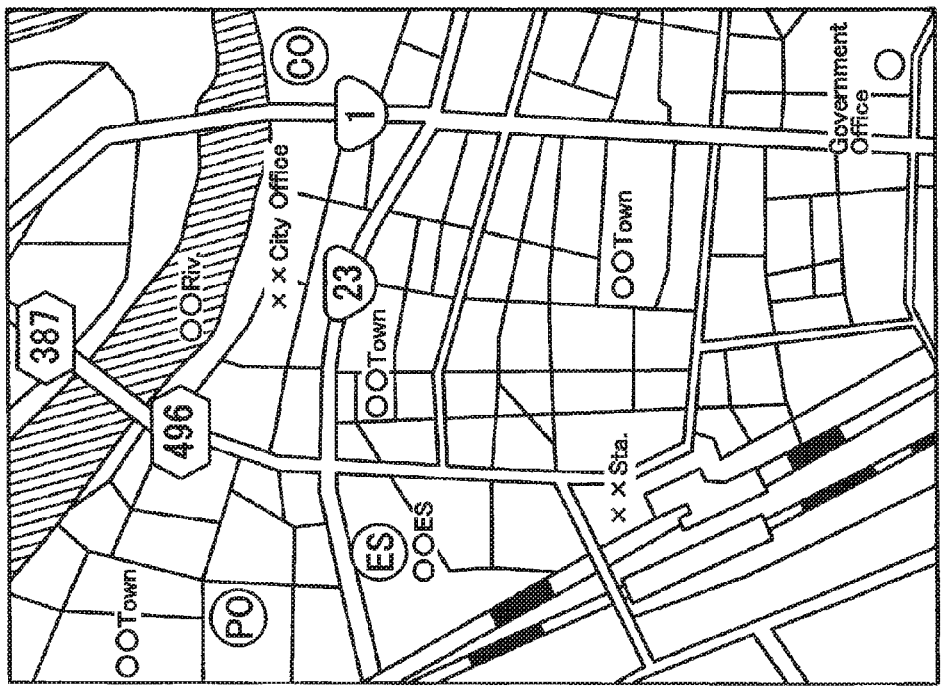
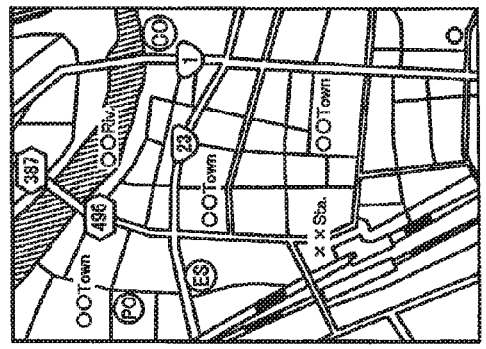

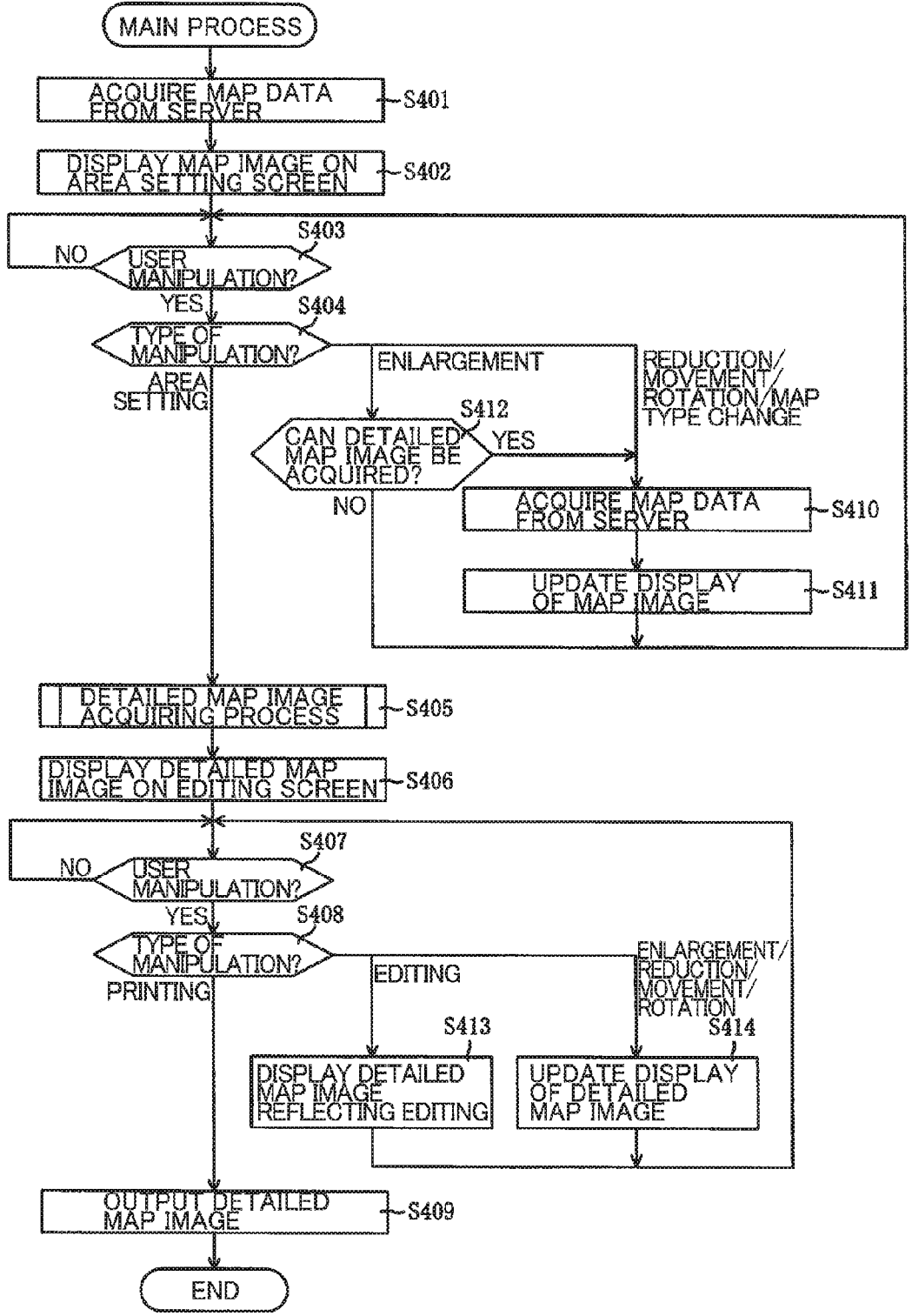

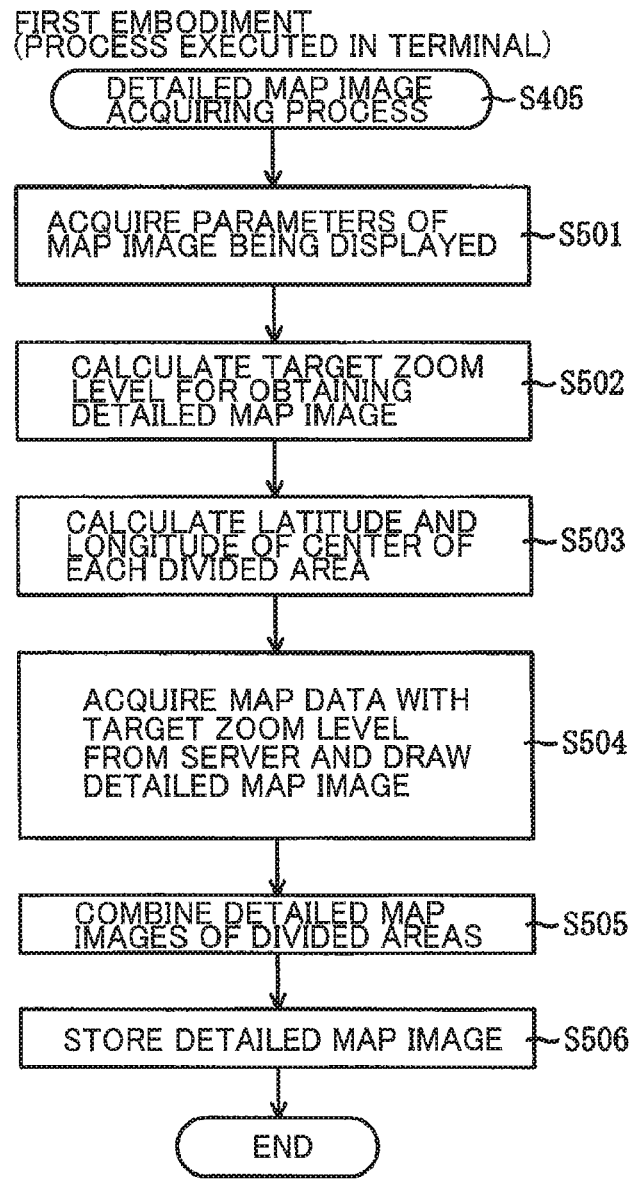

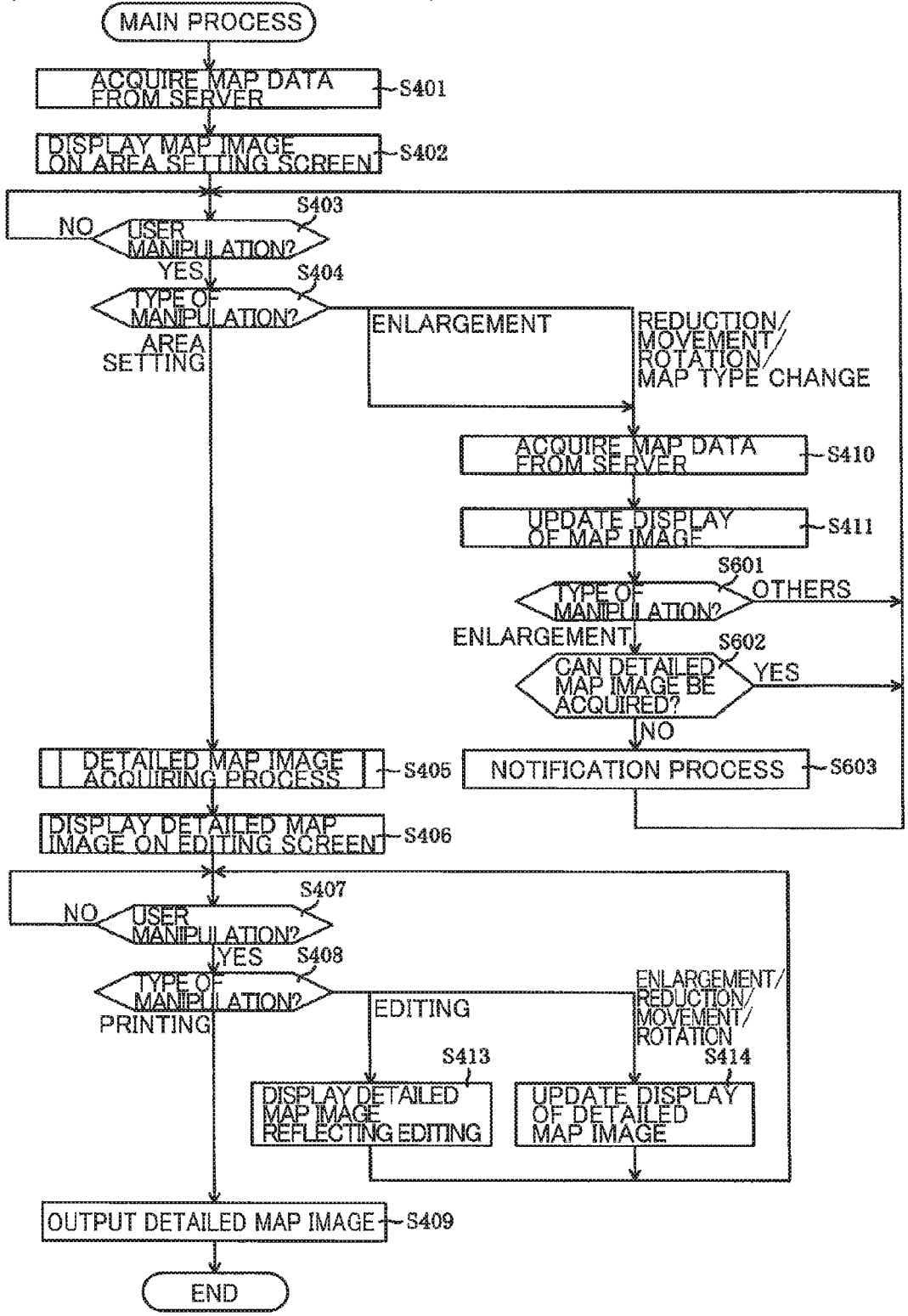

INFORMATION PROCESSING DEVICE EDITING MAP ACQUIRED FROM SERVER

CROSS REFERENCE TO RELATED APPLICATION

This application claims priority from Japanese Patent Application No. 2015-003562 filed Jan. 9, 2015. The entire content of the priority application is incorporated herein by reference.

TECHNICAL FIELD

The present disclosure relates to an information processing device.

BACKGROUND

In the related art, there have been techniques of acquiring map data corresponding to a relatively low resolution map in the case of displaying the map whereas acquiring map data of a high resolution map in the case of printing the displaying map which stands printing (Japanese Patent Application Publication No. 2002-36638).

SUMMARY

In the above-described technique, the maps having different resolutions are prepared in the server. However, a difference in scale between the maps is not taken into consideration. Therefore, the scale of the map printed on the basis of the map data acquired from the server may be inappropriate to the size of the printing result. As a result, for example, an information amount of the map with respect to the size of the printing result may be inappropriate. Namely, the map inappropriate to the size of the printing result may be printed.

In view of the foregoing, it is an object of the disclosure to provide an information processing device capable of appropriately printing a map image being displayed.

In order to attain the above and other objects, the present disclosure provides a non-transitory computer readable storage medium storing a set of program instructions installed on and executed by an information processing device. The information processing device includes: a display; a communication interface; and a controller. The program instructions includes: acquiring first map data from a server through the communication interface, the first map data being indicative of a first map image, a first zoom level indicating a first scale of the first map image; displaying the first map image based on the first map data on the display; setting a print area to the first map image; determining a second zoom level on the basis of the first zoom level, the second zoom level indicating a second scale of a second map image, the second map image including at least the print area in the first map image; and acquiring second map data from the server through the communication interface, the second map data being indicative of the second map image.

According to another aspect, the present disclosure provides an information processing device that includes: a display; a communication interface; and a controller. The controller is configured to perform: acquiring first map data from a server through the communication interface, the first map data being indicative of a first map image, a first zoom level indicating a first scale of the first map image; displaying the first map image based on the first map data on the display; setting a print area to the first map image; determining a second zoom level on the basis of the first zoom level, the second zoom level indicating a second scale of a second map image, the second map image including at least the print area in the first map image; and acquiring second map data from the server through the communication interface, the second map data being indicative of the second map image.

BRIEF DESCRIPTION OF THE DRAWINGS

The particular features and advantages of the disclosure as well as other objects will become apparent from the following description taken in connection with the accompanying drawings, in which:

FIG. 2 is a schematic diagram illustrating an outline of the present disclosure;

FIG. 4 is a flowchart illustrating steps of a main process in a first embodiment;

FIG. 5 is a flowchart illustrating steps of a detailed map image acquiring process;

FIG. 6 is a flowchart illustrating steps of a main process in a second embodiment.

DETAILED DESCRIPTION

Figure 1:
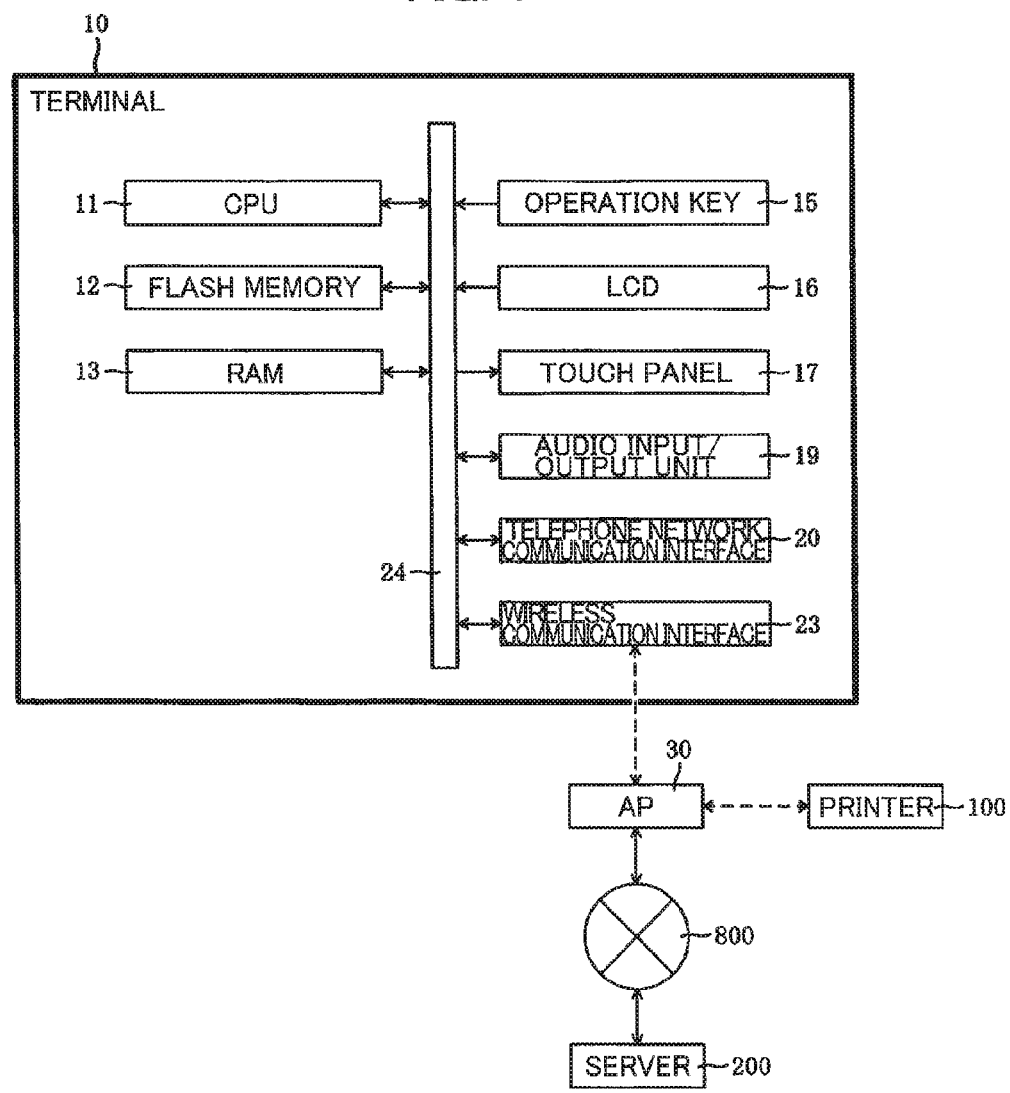
FIG. 1 is a block diagram illustrating an electrical configuration of a terminal.

Hereinafter, preferred embodiments of the present disclosure will be described while referring to the accompanying drawings. First, a first embodiment of the present disclosure will be described with reference to FIGS. 1 to 5. FIG. 1 is a block diagram illustrating an electrical configuration of a terminal 10 where a map application as one embodiment of an information processing program according to the present disclosure is installed.

In the embodiment, the terminal 10 is configured as a mobile terminal such as a smartphone. A CPU 11, a flash memory 12, a RAM 13, an operation key 15, an LCD 16, a touch panel 17, an audio input/output unit 19, a telephone network communication interface 20, and a wireless communication interface 23 are installed in the terminal 10. These components are connected to each other via a bus line 24.

The CPU 11 controls the components connected to the bus line 24 according to a program or a fixed value stored in the flash memory 12. The flash memory 12 is a rewritable nonvolatile memory and stores programs such as an operating system (hereinafter, referred to as an "OS") and a map application.

The OS is basic software implementing basic functions of the terminal 10. In the embodiment, the OS is Android® (Android is a registered trademark). In addition, hereinafter, in some cases, the CPU 11 which executes a program such as an OS or an application may be denoted by only a program name thereof. For example, in some cases, the term "application" may denote the "CPU 11 executing the application". Various applications including the map application control the components of the terminal 10 by using an API (Application Programming Interface) installed in the OS.

The map application according to the embodiment allows a map image based on map data acquired from the server 200 to be drawn and allows the drawn map image to be displayed in the LCD 16. In addition, in the embodiment, the map data acquired from the server 200 are vector-format image data (hereinafter, referred to as "vector data"). The map application inputs map data acquired from server 200 to a dedicated library installed in the terminal 10 to acquire a bitmap-format map image which is drawn by the library.

In addition, as described later for details, the map application according to the embodiment acquires from the server 200 the map data of the map of which the zoom level is raised in accordance with the paper size (for example, A4 size) of the printing paper (namely, the map scale is enlarged) in response to an input from a user in a case where a to-be-printed map area (hereinafter, referred to as a "printing map area") with respect to a map image being displayed in the LCD 16 is specified. Consequently, a map which is larger than the map image being displayed in the LCD 16 and of which the zoom level is in accordance with the paper size is printed.

Further, the "zoom level" is a value designating the scale of the map. A case where the zoom level is zero corresponds to the smallest-scale map. The higher the value of the zoom level is, the larger the map scale is. For each zoom level N (N is an integer greater than or equal to 0), a map of the world is divided into $2^N \times 2^N$ square areas, and vector data for the maps of the square areas are stored in the server 200 used in the embodiment. In other words, in the embodiment, as the value of the zoom level N is increased by 1, the map scale is enlarged two times. The index "N" of the zoom level is a value of greater than or equal to 0 and less than or equal to a maximum value which is allowed according to a type of a map (for example, a normal map or an aeronautical map) as a target.

Further, in the server 200, the vector data of the map include more detailed information (for example, narrower alley way, more detailed place names, more detailed building names, and more detailed signalized intersection names) so that, the higher the value of the zoom level N is, that is, the larger the map scale is, the more detailed map the map application can draw. Therefore, the higher the value of the zoom level is, the more detailed information such as narrow alley way, building names, and signalized intersection names the map application can display.

As described above, according to the map application of the embodiment, the map which is larger than the map image being displayed in the LCD 16 and of which the zoom level is in accordance with the paper size can be printed on the printing paper. In other words, according to the map application of the embodiment, detailed information that is not included in the map image displayed in the LCD 16 can be printed on the printing paper.

Even when an information amount to be displayed on a map is maintained intact whereas a physical size of the map image is enlarged, since the relative information amount with respect to the physical size of the map image is decreased, there may be a problem in that the map is not easy to read. In contrast, according to the map application of the embodiment, since the map of which the zoom level is in accordance with the paper size is printed, the occurrence of the problem can be suppressed. In other words, according to the map application of the embodiment, the map of the printing map area can be printed as an easy-to-read map.

Hereinafter, a physical size of an image (that is, the pixel size in the vertical direction and the pixel size in the horizontal direction) is simply referred to as an "image size" or a "size of an image". In other words, in the description hereinafter, the term "image size" or "size of an image" does not denote a data size.

In addition, in the case of printing a map image of which the zoom level is equal to that of the map image being displayed in the LCD 16 on a printing paper which is larger than the LCD 16, the map image being displayed in the LCD 16 needs to be enlarged in accordance with the paper size. Since the area of the image occupying one pixel is increased in a case where the map image is enlarged, the image becomes rough corresponding to the increase in the area. In contrast, according to the map application of the embodiment, as described above, since the map data of the map of which the zoom level is heightened in accordance with the paper size of the printing paper are acquired from the server 200, a bitmap-format map image drawn on the basis of the map data does not need to be enlarged at the time of printing. Consequently, the map of the printing map area can be printed with an appropriate image quality.

The RAM 13 is a rewritable volatile memory which temporarily stored various types of information on the execution of the printing application executed by the CPU 11. The operation on key 15 is a mechanical key for inputting instructions to the terminal 10 and is installed, for example, in a casing of the terminal 10. The LCD 16 is a liquid crystal display device displaying various types of screens. The touch panel 17 is installed to overlap the LCD 16. By touching or approaching the LCD 16 with a pointer such as a finger or a stick, instruction is input to the terminal 10. The audio input/output unit 19 is a device for inputting or outputting audio which is configured with a microphone or a speaker. The telephone network communication interface 20 is a circuit for performing communication via a mobile telephone network (not shown).

The wireless communication interface 23 is an interface for performing wireless communication via a wireless LAN. In the embodiment, the communication performed by the wireless communication interface 23 is wireless communication via a wireless LAN in accordance to the IEEE802.11b/g/n standards. More specifically, the communication is wireless communication (so-called "Wi-Fi® communication" (Wi-Fi is a registered trademark)) in accordance to the Wi-Fi® standard. In the embodiment, the wireless communication interface 23 is connected to a printer 100 through an access point (hereinafter, referred to as an "AP") 30 which is a relay device.

The AP 30 is a relay device which relays the Wi-Fi® communication. The AP 30 has a broadband router function and can be connected to the Internet 800. Therefore, the terminal 10 can be communicatably connected to various external devices such as a server 200 through the AP 30 and the Internet 800.

The server 200 is a map server providing a map service. In the embodiment, the server 200 is a map server that provides the map data configured with the vector data by using Google Maps® API (Google Maps is a registered trademark). As described above, in the server 200, the vector data of divided maps obtained by dividing the map of the world into $2^N \times 2^N$ square areas for each zoom level N are prepared.

The map application which is installed in the terminal 10 acquires the map data from the server 200, transfers the map data to a library of Google Maps® API installed in the terminal 10, and allows the library to draw a bitmap-format map image having a size according to the size of the screen of the LCD 16. In the following description, "to draw map data" denotes to draw a bitmap-format image from vector data.

The overview of the present disclosure will be described with reference to FIGS. 2 and 3. As described above, with respect to the map image being displayed in the LCD 16, if the printing map area is specified, the map application according to the embodiment acquires from the server 200 the map image of the map of which the zoom level is heightened in accordance with a printing paper size whereas the printing map area is maintained intact.

For example, as illustrated in FIG. 2, in a case where the entire map image Ga being displayed in the LCD 16 is specified as a to-be-printed map area, the map application calculates the zoom level by which the map image Ga has a size larger than that of the map image Ga and has the same size as that of the map application Gb at the time of printing, and the map application acquires the map data of the map with the calculated zoom level from the server 200.

In other words, the zoom level higher than the zoom level (hereinafter, referred to as a "display zoom level") Za in the map image Ga being displayed in the LCD 16 is calculated as the zoom level (hereinafter, referred to as a "target zoom level") Zb for obtaining the map image Gb having an image size larger than the image size of the map image Ga. The target zoom level Zb can be calculated from the display zoom level Za, the number of pixels Pa in the horizontal direction on the screen of the LCD 16, and the number of pixels Pb in the horizontal direction as a target at the time of printing. Further, not the number of pixels in the horizontal direction on the screen of the LCD 16 but the number of pixels in the horizontal direction on the display area of the map image on the screen may be defined as the number of pixels Pa.

More specifically, in a case where it is defined that the map scale is enlarged two times as the value of the zoom level is increased by 1, a value obtained by adding Za to the logarithm of an anti-log Pb/Pa to base 2 is calculated as the target zoom level Zb. In other words, $Zb = Za + \log_2(Pb/Pa)$.

In the embodiment, a paper size and a printing resolution at the time of printing are determined in advance. More specifically, it is determined that the paper size is A4 size (297 mm×210 mm) and the printing resolution is 248 dpi (dots per inch). In this condition, the number of pixels at the time of printing is set to 2896×2048 pixels. Further, the number of pixels of 2896×2048 pixels is calculated as a value having a margin with respect to the total vertical and horizontal lengths of the A4 size. However, an appropriate value may be employed as long as the value is lower than or equal to the number of pixels obtained by multiplying the total vertical and horizontal lengths of the A4 size by the printing resolution (that is, 2900×2050 pixels).

In a case where the number of pixel at the time of printing is 2896×2048 pixels, for example, if the number of pixels on the screen of the LCD 16 is 800×480 pixels (screen size: 81 mm×61 mm, display resolution: about 233 dpi), the $\log_2(Pb/Pa)$ is $\log_2(2048/480)$, that is, about 2.0931. In a case where the display zoom level Za is set to 5, in this example, the target zoom level Zb is about 7.0931.

Therefore, in this example, the map image is drawn with such a zoom level that the scale of the map image being displayed is set to a multiple of 2 to the power 2.0931 (that is, about 4.3). In other words, in the map image drawn with the target zoom level Zb, the distance on the map per unit number of pixels is about 1/4.3 of the map image being displayed (that is, the map image drawn with the display zoom level Za), and thus, a more detailed map is drawn. Hereinafter, the map image drawn with the target zoom level Zb calculated from the above-described Equation $Zb = Za + \log_2(Pb/Pa)$ is referred to as a "detailed map image".

In the above example, the target zoom level Zb is calculated by using the number of pixels on the screen of the LCD 16 and the number of pixels at the time of printing. Alternatively, the number of pixels on the screen of the LCD 16 may be calculated from the screen size and the display resolution, and the calculated number of pixels may be used to calculate the target zoom level Zb. Similarly, the number of pixels in the printing period may be calculated from the paper size and the printing resolution, and the calculated number of pixels may be used to calculate the target zoom level Zb.

In addition, in the above example, the number of pixels Pa and the number of pixels Pb are set as the number of pixels in the horizontal direction on the screen of the LCD 16 and the number of pixels in the horizontal direction as the target at the time of printing, respectively. Alternatively, the number of pixels Pa and the number of pixels Pb may be set to as the number of pixels in the vertical direction on the screen of the LCD 16 and the number of pixels in the vertical direction as the target at the time of printing. In a case where the number of pixels Pb is set as the number of pixels in the vertical direction as the target at the time of printing, the number of pixels in the vertical direction on the display area 16a of the map image on the screen of the LCD 16 may be set as the number of pixels Pa.

Figure 3B:
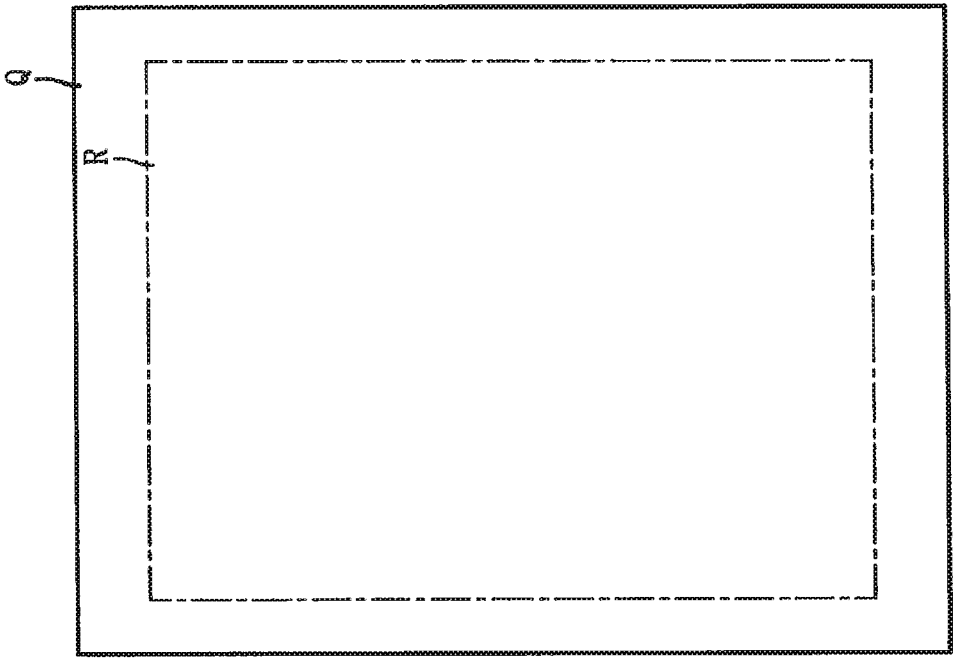
FIGS. 3A and 3B are schematic diagrams illustrating an outline of the present disclosure.
Figure 3A:
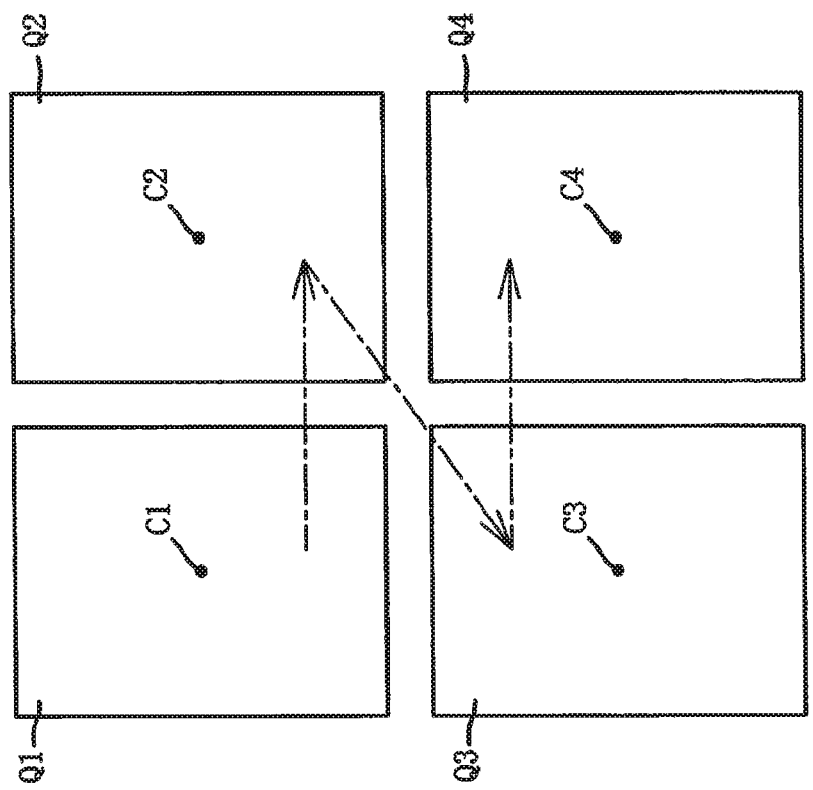

In the embodiment, as illustrated in FIG. 3A, in the case of drawing the detailed map image, the to-be-printed map area is divided into four areas, and the map image of the map with the zoom level Zb is drawn with respect to each of the divided areas Q1 to Q4. The positions of the divided areas Q1 to Q4 can be specified by respective latitudes and longitudes C1 to C4 of the centers of the divided areas Q1 to Q4, each of which is calculated from the latitude and longitude of the center of the map image being displayed, the number of pixels in the vertical direction on the screen of the LCD 16 and the number of pixels in the horizontal direction on the screen of the LCD16, and the display zoom level Za.

The divided areas Q1 to Q4 are processed area by area. In other words, with respect to the divided areas Q1 to Q4, the map data are acquired from the server 200 area by area, and the map image is drawn. In the embodiment, the divided areas are processed in the order of the upper left divided area Q1, the divided area Q2 at the right side of the divided area Q1, the lower left divided area Q3, and the divided area Q4 at the right side of the divided area Q3.

In general, the map data having an area wider than the display area are acquired from the server 200 in order to suppress the stoppage of display of the map image in a case where the display area of the map image is moved according to the swipe manipulation. Therefore, after one divided area is processed, the next divided area adjacent to the former divided area is taken as a processing object, and with respect to the next to-be-processed divided area, the map data of the periphery of the divided area acquired with respect to the former processed divided area can be used. Consequently, the time required for acquisition of the map data can be shortened.

As illustrated in FIG. 3B, a combined image Q is generated by combining the map image drawn in the respective divided areas Q1 to Q4 (that is, the map images of the maps with the zoom level Zb). In the combined image Q, an image of a to-be-printed map area R is stored as a predetermined format file in the flash memory 12. The format of the file of the combined image is, for example, a png format. Since the map image drawn with the target zoom level is stored as a file in the flash memory 12, a loss of the map image drawn with the target zoom level can be suppressed. In addition, since the map image based on the file stored in the flash memory 12 is displayed, the map image can be enlarged or reduced without re-acquiring the map data from the server 200 in the displaying of the map image drawn with the target zoom level.

In addition, the file of the map image drawn with the target zoom level is stored in the flash memory 12, whereas the drawing data of the map image drawn by the library are bitmap data and are stored in a frame buffer installed on the RAM 13.

FIG. 4 is a flowchart illustrating a main process. The process is a process executed by the CPU 11 according to the map application stored in the flash memory 12, and is started when the map application is started. The CPU 11 acquires the map data from the server 200 (S401). More specifically, the CPU 11 outputs network information such as a MAC address of the AP 30, a map type, and an initial value (for example, 5) of the zoom level to the server 200 through the wireless communication interface 23. The CPU 11 acquires from the server 200 the map data corresponding to the map with the zoom level of the initial value, which is centered on the current location and of which the map type is designated.

Further, the CPU 11 stores the value of the zoom level output to the server 200 in S401 in the RAM 13. In addition, the CPU 11 stores the latitude and longitude of the center returned together with the map data acquired in S401 as the initial value in the RAM 13.

The CPU 11 displays the map image drawn by the library based on the acquired map data on the screen (hereinafter, referred to as an "area setting screen") for setting the printing map area (S402). Further, the map image is displayed with an aspect ratio of a predetermined paper size (in the embodiment, A4 size) on the area setting screen. Therefore, since the map image displayed on the area setting screen can be printed with the aspect ratio, the user can set the printing map area while performing printing preview.

The CPU 11 waits until the input of the user manipulation on the area setting screen performed through the touch panel 17 is received (S403: NO). When the CPU 11 receives the input of the user manipulation on the area setting screen (S403: YES), in a case where the CPU 11 determines that the manipulation is manipulation instructing reduction of the scale of the map, movement of the display area of the map image, rotation of the map image, or a change in map type (S404: REDUCTION/MOVEMENT/ROTATION/MAP TYPE CHANGE), the CPU 11 acquires from the server 200 the map data for drawing the map image reflecting the change according to the manipulation (S410).

For example, in a case where the user manipulation is the manipulation instructing the reduction of the map scale, the CPU 11 calculates the zoom level according to the instruction and outputs the calculated zoom level and the latitude and longitude of the center of the map image being displayed on the area setting screen to the server 200 through the wireless communication interface 23. Further, the user may instruct the value of the zoom level. In this case, the instructed value of the zoom level and the latitude and longitude of the center of the map image being displayed on the area setting screen may be output to the server 200 through the wireless communication interface 23. As a result, the CPU 11 acquires from the server 200 the map data corresponding to the map with the display zoom level Za calculated according to the instruction, which is centered on the same latitude and longitude as the center of the map image being displayed.

Alternatively, in a case where the user manipulation is the swipe manipulation instructing the movement of the map, the CPU 11 calculates the latitude and longitude of the center of the map image of the movement destination from the latitude and longitude of the current center based on the movement amount of the map image according to the swipe manipulation. More specifically, the numbers of pixels moved in the vertical/horizontal direction as a movement amount are calculated from the starting and ending points of the swipe manipulation. Since a width of the latitude corresponding to the number of pixels moved in the vertical direction and a width of the longitude corresponding to the number of pixels moved in the horizontal direction are calculated from the number of pixels in the vertical direction, the number of pixels in the horizontal direction, and the display zoom level Za, the latitude and longitude of the center of the map image of the movement destination are calculated from these values and the latitude and longitude of the center of the map image being displayed. As a result, the CPU 11 acquires from the server 200 the map data corresponding to the map with the current display zoom level Za, which is centered on the latitude and longitude of the center of the map image of the movement destination.

Further, the CPU 11 stores the latitude and longitude of the center of the map image and the zoom level output to the server 200 in S410 in the RAM 13. In other words, every time when the latitude and longitude of the center of the map image and the zoom level are output to the server 200 in S410, the latitude and longitude of the venter of the map image and the value of the zoom level stored in the RAM 13 are updated.

After the process of S410, the CPU 11 updates the map image on the area setting screen to the map image drawn by the library on the basis of the map data acquired from the server 200 in S410 (S411), and the CPU 11 allows the process to proceed to S403.

On the other hand, in a case where the CPU 11 determines that the user manipulation input on the area setting screen is the manipulation instructing the enlargement of the map scale (S404: ENLARGEMENT), the CPU 11 determines with respect to the map image of which the scale is enlarged according to the instruction whether or not the detailed map image can be acquired from the map image (S412).

In a case where the CPU 11 sets the zoom level of the map image of which the scale is enlarged according to the instruction to the display zoom level Za in S412, the CPU 11 determines whether or not the zoom level for obtaining the detailed map image (that is, the target zoom level Zb) is lower than or equal to the maximum value which can be taken as the zoom level.

More specifically, the CPU 11 calculates the display zoom level Za according to the instruction. The CPU 11 calculates the target zoom level Zb from the calculated value of Za, the number of pixels Pa in the horizontal direction on the screen of the LCD 16, and the number of pixels Pb in the horizontal direction as a target at the time of printing according to the above equation $Zb=Za+\log_2(Pb/Pa)$. The CPU 11 determines whether or not the calculated Zb is the maximum value which can be taken as the zoom level.

In the server 200, the maximum value which can be taken as the zoom level is determined for each map type (for example, a normal map or an aerial map). In the map application, the maximum value which can be taken as the zoom level in the server 200 is prepared for each map type. Further, the maximum value of the zoom level which van be taken for the map of the type being displayed may be queried to the server 200 at every necessary time.

In a case where the CPU 11 determines that the calculated Zb is smaller than or equal to the maximum value which can be taken as the zoom level, the CPU 11 determines that the detailed map image can be acquired from the map image of which the scale is enlarged according to the user manipulation and affirms the determination of SA412. On the other hand, in a case where the CPU 11 determines that the calculated Zb is larger than the maximum value which can be taken as the zoom level, the CPU 11 negates the determination of SA412.

In a case where the CPU 11 affirms the determination of S412 (S412: YES), the CPU 11 acquires from the server 200 the map data for drawing the map image of which the scale is enlarged according to the user manipulation (S410). More specifically, the CPU 11 outputs the latitude and longitude of the center of the map image being displayed on the area setting screen and the display zoom level Za calculated according to the instruction to the server 200 through the wireless communication interface 23. The CPU 11 acquires from the server 200 the map data corresponding to the map with the display zoom level Za calculated according to the instruction, which is centered on the same position as the map image being displayed.

After the process of S410, the CPU 11 updates the map image on the area setting screen to the map image drawn by the library based on the map data acquired from the server 200 in S410 (S411), and the CPU 11 allows the process to proceed to S403. Therefore, the map image on the area setting screen is updated to the map image of which the scale is enlarged according to the user manipulation in a case where the detailed map image can be acquired even after the enlargement of the scale.

On the other hand, in a case where the CPU 11 negates the determination of S412 (S412: NO), the CPU 11 allows the process to proceed to S403. Therefore, in a case where the detailed map image cannot be acquired from the map image of which the scale is enlarged according to the user manipulation, the scale enlargement is prohibited, and the map image being displayed is maintained. In other words, in the embodiment, only the map image with the zoom level from which the detailed map image can be acquired is displayed on the area setting screen 50.

In a case where the target zoom level Zb calculated with respect to the display zoom level Za in response to the instruction exceeds the maximum value which can be taken as the zoom level, there is a possibility that the scale appropriate to the image size is not secured for the detailed map image and an undesired printing result may be obtained. In contrast, in the embodiment, in a case where the detailed map image cannot be acquired from the map image of which the scale is enlarged according to the user manipulation, since the scale enlargement is prohibited, a very appropriate printing result with respect to the detailed map image can be secured for the user.

In a case where the CPU 11 determines in S404 that the user manipulation input on the area setting screen is the manipulation instructing the setting of the printing map area (S404: AREA SETTING), the CPU 11 executes a detailed map image acquiring process (S405). S405 is the process of acquiring the detailed map image of the map area set by the user manipulation.

Now, the detailed map image acquiring process (S405) will be described in detail with reference to FIG. 5. The CPU 11 acquires parameters of the map image being displayed on the area setting screen, that is, the map image in the printing map area (S501). More specifically, the CPU 11 acquires as the parameters, the latitude and longitude of the center of the map image being displayed, the zoom level of the map image being displayed, and the number of pixels in the vertical direction on the screen of the LCD 16 and the number of pixels in the horizontal direction on the screen of the LCD 16. Further, the latitude and longitude of the center and the zoom level of the map image being displayed have the values stored in the RAM 13 in S401 or S410. In other words, in S501, the CPU 11 acquires from the RAM 13 the latitude and longitude of the center and the zoom level of the map image being displayed. On the other hand, the number of pixels in the vertical direction on the screen of the LCD 16 and the number of pixels in the horizontal direction on the screen of the LCD 16 are stored as specifications of the terminal 10 in the flash memory 12 in advance.

The CPU 11 calculates the zoom level (that is, the target zoom level Zb) for obtaining the detailed map image (S502). More specifically, the CPU 11 calculates the target zoom level Zb from the display zoom level Za acquired in S501, the number of pixels (that is, the number of pixels Pa) in the horizontal direction on the screen of the LCD 16, and the number of pixels Pb in the horizontal direction as a target at the time of printing according to the above equation $Zb=Za+\log_2(Pb/Pa)$.

The CPU 11 calculates the latitude and longitude of the center of each of the divided areas (S503). In the embodiment, since the printing map area is divided into four areas, the CPU 11 calculates the latitude and longitude of the center of each of the four divided areas. More specifically, the CPU 11 calculates the latitude and longitude of the center of each of the divided areas from the latitude and longitude of the center of the map image being displayed, the number of pixels in the vertical direction on the screen of the LCD 16 and the number of pixels in the horizontal direction on the screen of the LCD 16, and the display zoom level Za.

In other words, since the width of the latitude corresponding to the number of pixels in the vertical direction on the screen of the LCD 16 and the width of the longitude corresponding to the number of pixels in the horizontal direction on the screen of the LCD 16 are calculated from the number of pixels in the vertical direction on the screen of the LCD 16 and the number of pixels in the horizontal direction on the screen of the LCD 16, and the display zoom level Za, the latitude and longitude of the center of each of the divided areas can be calculated from these values and the latitude and longitude of the center of the map image being displayed.

Further, at the time of calculating the latitude and longitude of each center of the divided areas, the number of pixels in the vertical direction in the display area of the map image and the number of pixels in the horizontal direction in the display area of the map image may be used instead of the number of pixels in the vertical direction on the screen of the LCD 16 and the number of pixels in the horizontal direction on the screen of the LCD 16.

The CPU 11 acquires from the server 200 the map data with the target zoom level Zb calculated in S502 with respect to each of the divided areas (S504). In the embodiment, the four divided areas are processed in the order of the upper left divided area, the upper right divided area, the lower left divided area, and the lower right divided area.

More specifically, the CPU 11 outputs to the server 200 through the wireless communication interface 23 the latitude and longitude of the center of the divided area calculated in S503 and the target zoom level Zb calculated in S502 with respect to one divided area according to the processing order and acquires from the server 200 the map data corresponding to the map with the target zoom level Zb with respect to the to-be-processed divided area. The CPU 11 allows the library to draw the detailed map image with respect to the to-be-processed divided area on the basis of the acquired map data (S504).

Further, during the acquisition of the map data with respect to the to-be-processed divided area, the CPU 11 allows a drawing-completed portion of the detailed map image with respect to the divided area to be displayed on the LCD 16. As a result, since user can recognize that the detailed map image (more specifically, the to-be-processed divided area) is being drawn, a feeling of securing can be given to the user.

The CPU 11 combines the drawing data of the detailed map images drawn in each of the divided areas (S505). The CPU 11 extracts pixel data included in the range of the printing map area in the combined image obtained in S505 and stores the pixel data as a predetermined format (for example, png format) file in the flash memory 12 (S506), and the CPU 11 allows the process to be ended. Further, the printing map area is specified by the latitudes and longitudes of the upper left and lower right points. The latitudes and longitudes of the upper left and lower right points of the printing map area can be calculated from the latitude and longitude of the center acquired in S501 and the number of pixels in the vertical direction on the screen of the LCD 16, and the number of pixels in the horizontal direction on the screen of the LCD 16.

The description is returned to FIG. 4. The CPU 11 allows the detailed map image obtained in S405 to be displayed on the screen (hereinafter, referred to as an "editing screen") for editing the detailed map image (S406). As described above, the detailed map image is stored as a file in the flash memory 12, and the detailed map image stored in the flash memory 12 is displayed on the editing screen. With the display resolution of the screen of the LCD 16, the detailed map image cannot be displayed in the state where the detailed map image is maintained intact. Therefore, in the case of displaying the detailed map image on the editing screen, the detailed map image is displayed in the state where the pixels are substantially thinned out according to the display resolution of the screen of the LCD 16. The CPU 11 waits until the input of the user manipulation on the editing screen performed through the touch panel 17 is received (S407: NO).

When the CPU 11 receives the input of the user manipulation on the editing screen (S407: YES), in a case where the CPU 11 determines that the manipulation is manipulation instructing enlargement or reduction of the display area in the detailed map image, movement of the display area in the detailed map image, or rotation of the detailed map image (S408: ENLARGEMENT/REDUCTION/MOVEMENT/ROTATION), the detailed map image displayed on the editing screen is updated to the detailed map image reflecting the change according to the manipulation (S414), and the CPU 11 allows the process to proceed to S407. Further, since the detailed map image is limited to the map in the area specified as the printing area by the user manipulation, the enlargement, reduction, and movement are performed within the range of the detailed map image.

On the other hand, in a case where the CPU 11 determines that the user manipulation input on the editing screen is the manipulation instructing the editing on the detailed map image (S408: EDITING), the CPU 11 allows the contents of the editing by the user to be reflected on the detailed map image and updates the detailed map image displayed on the editing screen to the detailed map image reflecting the editing (S413), and the CPU 11 allows the process to proceed to S407. Further, displaying of the icon image at the designated position or writing in the detailed map image is exemplified as the editing on the detailed map image.

In a case where the CPU 11 determines that the user manipulation input on the editing screen is the manipulation instructing the execution of printing (S408: PRINTING), the CPU 11 outputs the file of the detailed map image in the printing map area to the printer 100 through the wireless communication interface 23 (S409), and the CPU 11 allows the process to be ended. As a result, the detailed map image is printed on the printing paper in the printer 100.

In a case where the detailed map image output to the printer 100 is the detailed map image reflecting the editing according to the user manipulation in S413, the CPU 11 generates a file of the detailed map image reflecting the editing separately from the file of the detailed map image stored in S506 and outputs the file to the printer 100. Therefore, in a case where the editing on the detailed map image is performed, the printer 100 can be allowed to print the detailed map image reflecting the editing. On the other hand, in a case where the editing on the detailed map image is not performed, the CPU 11 outputs the file of the detailed map image stored in S506 to the printer 100.

Further, since the detailed map image displayed on the editing screen is updated to the detailed map image reflecting the change according to the manipulation in S414, there may be some cases where the entire printing map area is not be displayed on the editing screen. However, even in these cases, the detailed map image output to the printer 100 is the detailed map image in the printing map area. Therefore, the contents of the printing map area which are initially set can be printed even in a case where the contents of the editing screen do not include the entire printing map area, According to the first embodiment, the target zoom level Zb by which the printing map area has the same size as that of the detailed map image is determined on the basis of the display zoom level Za of the map image being displayed in the LCD 16. Therefore, the map of the detailed map image can be set to be the map of which the scale is in accordance with the image size. Consequently, it can be suppressed that the information amount of the map of the detailed map image is inappropriate to the image size.

In addition, the target zoom level Zb is calculated as a value according to the ratio of the number of pixels Pa in the horizontal direction on the screen of the LCD 16 and the number of pixels Pb in the horizontal direction as the target at the time of printing (that is, the number of pixels in the horizontal direction in the detailed map image). As a result, since the number of pixels in the detailed map image has the value according to the number of pixels in the map image being displayed in the LCD 16, the detailed map image becomes an image which is rougher than the map image being displayed in the LCD 16. Therefore, deterioration in image quality in the printing period can be suppressed.

In addition, when the user manipulation instructing the enlargement of the map scale is input on the area setting screen, in a case where the detailed map image cannot be acquired from the map image which is enlarged according to the instruction, the scale enlargement based on the user's instruction is prohibited. Therefore, the printing result of an appropriate image quality can be secured.

Next, a second embodiment will be described with reference to FIG. 6. In the configuration of the above-described first embodiment, when the user manipulation instructing the enlargement of the map scale is input on the area setting screen, the scale enlargement according to the instruction is prohibited in a case where the detailed map image cannot be acquired from the map image of which the scale is enlarged according to the instruction.

Alternatively, in the second embodiment, in a case where the detailed map image cannot be acquired from the map image of which the scale is enlarged according to the user's instruction, the map image of which the scale is enlarged in response to the user's instruction is drawn, and after that, a message thereof is notified. In the second embodiment, the same parts and components as those of the first embodiment are designated by the same reference numerals, and the description thereof is omitted.

Hereinafter, a configuration unique to the second embodiment will be mainly described. FIG. 6 illustrates a main process of the second embodiment. The process is a process executed by the CPU 11 of the terminal 10 according to the map application of the second embodiment. Similarly to the first embodiment, the process is started when the map application is started.

In a case where the CPU 11 determines that the user manipulation input on the area setting screen is the manipulation instructing the enlargement of the map scale (S404: ENLARGEMENT), unlike the first embodiment, the CPU 11 executes the processes of S410 and S411 irrespective whether or not the detailed map image can be acquired. In other words, the CPU 11 acquires from the server 200 the map data for drawing the map image of which the scale is enlarged according to the user manipulation.

After the process of S411, the CPU 11 determines the type of the user manipulation that is a trigger of S410 and S411 (S601). In a case where the CPU 11 determines that the manipulation other than the manipulation instructing the enlargement of the map scale is performed (S601: OTHERS), the CPU 11 allows the process to proceed to S403.

On the other hand, in a case where the CPU 11 determines that the manipulation instructing the enlargement of the map scale is performed (S601: ENLARGEMENT), similarly to the above-described S412, the CPU 11 determines with respect to the map image of which the scale is enlarged according to the instruction whether or not the detailed map image can be acquired from the map image (S602).

In a case where the CPU 11 affirms the determination of S602 (S602: YES), the CPU 11 allows the process to proceed to S403. On the other hand, in a case where the CPU 11 negates the determination of S602 (S602: NO), that is, in a case where the CPU 11 cannot acquire the detailed map image from the map image of which the scale is enlarged according to the user manipulation, the CPU 11 performs a notification process of notifying a message thereof (S603), and the CPU 11 allows the process to proceed to S403.

The notification performed in S603 is, for example, performed by performing a pop-up display on the map image updated in S411. As an example of the notification, there is text information "when printing is performed with this scale, there is a possibility that a good image quality cannot be obtained". Notification by predetermined mark display or sound may be performed.

In the embodiment, in a case where the map image with the zoom level by which the detailed map image cannot be acquired (that is, the map image as a target of notification in S603) is set as the printing map area, not the zoom level calculated by the above equation $Zb=Za+\log_2(Pb/Pa)$ but the map data of the zoom level of the maximum value which can be taken as the zoom level is acquired from the server 200.

Further, the map data of the zoom level calculated by the above equation $Zb=Za+\log_2(Pb/Pa)$ may be acquired from the server 200 by setting the printing map area as the area configured with the area set by the user and the peripheral area thereof and by substantially lowering the display zoom level Za from the current value. In this case, since the area wider than the area set by the user is printed, the image quality of the map image by the printing becomes appropriate although the area that is intended as the printing map area by the user is printed to be relatively smaller.

According to the second embodiment, when the user manipulation instructing the enlargement of the map scale is input on the area setting screen, a possibility that a printing result of a very appropriate image quality cannot be obtained is notified to the user in a case where the detailed map image cannot be acquired from the map image which is enlarged in response to the instruction. Therefore, the user can recognize the possibility that the printing result of an appropriate image quality cannot be obtained because of enlarging the scale.

In the above-described embodiments, the map application which can embody the flowcharts illustrated in FIGS. 4 to 6 is an example of a set of program instructions. The terminal 10 where the map application is installed is an example of an information processing device. The CPU 11 is an example of a controller. The LCD 16 is an example of a display. The wireless communication interface 23 is an example of a communication interface. The touch panel 17 is an example of a manipulation unit. The flash memory 12 is an example of a storage unit.

While the description has been made in detail with reference to specific embodiments thereof, it would be apparent to those skilled in the art that various changes and modifications may be made therein without departing from the spirit and scope of the above described embodiments.

For example, in the above-described embodiments, the terminal 10 such as a smartphone is exemplified as the information processing device in which the map application is installed. However, a device such as a tablet terminal, a personal computer, a navigation device, a music reproducing device, or a digital camera can be employed as the information processing device in which the map application is to be installed. In the above-described embodiments, the OS installed in the terminal 10 is described to be the Android® OS. However, configurations employing other OSs may be used.

In the above-described embodiments, the paper size is fixed to the A4 size. However, the paper size may be a size which the user selects as one of the printing settings in the displaying of the area setting screen. As described above, since the number of pixels at the time of printing is determined according to the paper size and the printing resolution, in a case where the paper size is changed, the number of pixels at the time of printing is also changed. Therefore, in a case where the paper size is changed, the target zoom level Zb is calculated by using the number of pixels Pb according to the changed paper size.

In this case, every time when the paper size is changed, the aspect ratio of the map image which is to be displayed on the area setting screen may be configured to be changed. The aspect ratio of the map image displayed on the area setting screen associated with the change in paper size may be changed by the re-drawing of the map image.

Figure 7:
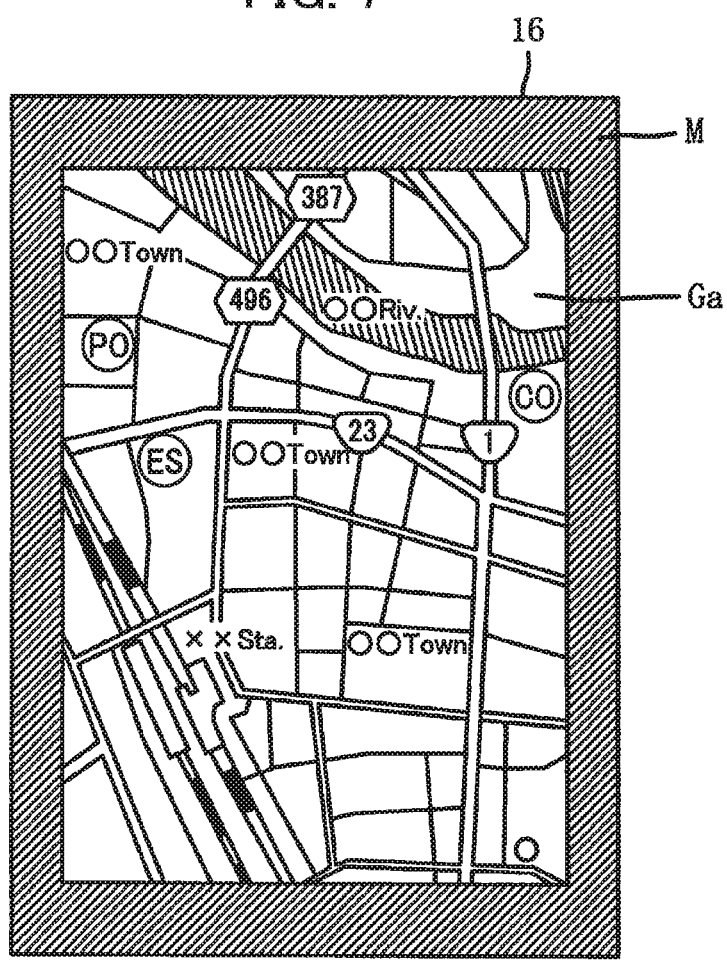
FIG. 7 is a diagram explaining a modified example of the present disclosure.

Alternatively, as illustrated in FIG. 7, a mask image M forming a margin area in the periphery of the map image Ga may be superposed on the map image Ga displayed on the LCD 16 so that the aspect ratio of the map image Ga to be displayed is changed by changing the size of the margin area of the mask image M according to the change of the paper size. According to the modified example, the map image can be displayed with the aspect ratios of various paper sizes without re-drawing the map image.

In addition, in the above-described embodiments, 248 dpi is exemplified as the printing resolution. However, a configuration of using the value which the user selects among a plurality of printing resolutions as the printing settings may be used. In this case, similarly to the above-described case of the paper size, the number of pixels at the time of printing is changed. Therefore, in a case where the printing resolution is changed, the target zoom level Zb is calculated by using the number of pixels Pb according to the changed printing resolution.

In the above-described embodiments, the number of divided areas for obtaining the detailed map image is set to four. However, the division number of the printing map area is not limited to four, but various division numbers such as two, nine, and the like may be employed. Further, even in a case where the printing map area is divided into three or more stages in the up/down direction and/or two or more columns in the left/right direction, similarly to the above-described embodiments, it is preferable that, after one divided area is processed, the next divided area adjacent to the former divided area is taken as a processing object. In addition, if the size of the frame buffer permits, a configuration of generating the detailed map image in the printing map area itself by one-time acquisition and drawing of the map data without dividing the printing map area may be used.

In the above-described embodiments, during the acquisition of the map data with respect to the to-be-processed divided area, a drawing-completed portion of the detailed map image with respect to the divided area is configured to be displayed on the LCD 16. However, a configuration where the map image drawn in the divided area processed prior to the to-be-processed divided area is displayed on the LCD 16 may be used. Even in the modified example, since user can recognize that drawing is being performed in the detailed map area, a feeling of securing can be given to the user.

In the above-described embodiments, it is defined that the map scale is enlarged two times as the value of the zoom level is increased by 1. However, the map scale may be enlarged J-times (J is a natural number of 3 or more) as the value of the zoom level is increased by 1. In the modified example, the equation of calculation of the target zoom level Zb becomes $Za+\log_J(Pb/Pa)$. In other words, the value of the base in the above equation is changed according to the definition of the zoom level.

In the above-described embodiments, the target zoom level Zb is configured to be calculated from the number of pixels Pa in the horizontal direction on the screen of the LCD 16 and the number of pixels Pb in the horizontal direction as a target at the time of printing by using the calculation equation. However, a configuration where a combination of the number of pixels Pb and $\log_2(Pb/Pa)$ is prepared as a table may be used.

In the above-described embodiments, in a case where the printing map area is set on the area setting screen, the detailed map image in the printing map area is configured to be displayed on the editing screen where the detailed map image can be edited. Alternatively, in a case where the printing map area is set on the area setting screen, the detailed map image in the printing map area may be configured to be output to the printer 100 to be printed without using the editing screen. In other words, in the main processes (FIGS. 4 and 6), the processes of S405 to S408, S413, and S414 may be configured to be omitted. Further, a configuration where the user can select one of a mode where the editing screen can be displayed and a mode where the printing is performed without using the editing screen in a case where the printing map area is set on the area setting screen may be used.

In the above-described embodiments, a configuration where, every time when the scale of the map image is changed according to the user manipulation, the zoom level is output to the server 200 and the map image is acquired according to the zoom level may be used. Alternatively, a configuration where, in a case where relatively detailed map data with the scale are acquired from the server 200 and the scale of the map image is changed according to the user manipulation, the zoom level corresponding to the changed scale is input to the library and the library is allowed to re-draw the map image according to the zoom level may be used.

In the above-described embodiments, the server using Google Maps® API is exemplified as the server 200. However, an appropriate server which provides map data of various formats may be employed as the server 200. However, an appropriate server which provides map data of various formats may be employed as the server 200. For example, a server using Google Static Maps® API (Google Static Maps is a registered trademark) may be employed as the server 200. Further, the server 200 is not limited to the server provided by Google® (Google is a registered trademark), but servers provided by various entities can be used.

The map data provided by the server using Google Static Maps® API (hereinafter, referred to as a "bitmap map server") are not vector data but bitmap-format image data (hereinafter, referred to as a "bitmap map data"). The bitmap map data can display the map image on the basis of the data themselves. Therefore, in the case of using the bitmap map server, the drawing of the map image by the library is unnecessary similarly to the above-described embodiment.

In the case of using the bitmap map server, the map application outputs the screen size of the LCD 16, the latitude and longitude of the center of the map image, and the zoom level to the server so as to acquire the bitmap map data from the server. Further, for each zoom level N, a map of the world is divided into $2^N \times 2^N$ square areas, and the bitmap map data for the maps of the square areas are stored in the bitmap map server. Similarly to the case of the above-described vector data, the bitmap map data include more detailed map information (for example, narrower alley way, more detailed place names, more detailed building names, and more detailed signalized intersection names) as the value of the zoom level N becomes larger.

In the above-described modified example of using the bitmap map data, four or nine areas (that is, 2×2 or 3×3 areas) which are centered on the latitude and longitude of the center of the map image being displayed are calculated as the divided areas. Therefore, with respect to the calculated four or nine areas, the map data of which the zoom level is heightened are acquired from the server 200.

In the above-described embodiments, the configuration where the latitude and longitude of the center are set as a reference position and the position of the acquired map is specified is used. However, the reference position is not limited to the center. An appropriate position can be set as the reference position for acquiring the map according to the specifications of the API which provides the map data.

In the above-described embodiments, a case where the size of the printing paper is larger than that of the screen of the LCD 16 is exemplified. However, even in a case where the size of the printing paper is smaller than that of the screen of the LCD 16, the target zoom level Zb may be calculated according to the above equation, and the map image with the calculated zoom level may be printed.

In the above-described embodiments, the configuration where the latitude and longitude of the center of the map image and the zoom level are output to the server 200 is used. In addition to the above information, the size of the screen of the LCD 16 may be transferred to the server 200, and the terminal 10 may acquire from the server 200 the map data in the range according to the size of the screen transferred to the server 200 or the map data in the range wider than the size of the screen. In the latter case, the terminal 10 may be allowed to display the map image within the range of the screen.

In the above-described embodiments, the configuration where the CPU 11 executes the processes illustrated in FIGS. 4 to 6 is described. However, a configuration where the processes illustrated in the figures are cooperatively executed by a plurality of CPUs may be used. In addition, a configuration where the processes illustrated in the figures are executed by a single IC such as ASIC or are cooperatively executed by a plurality of the ICs may be used. Further, a configuration where the processes illustrated in the figures are cooperatively executed by the CPU 11 and the IC such as ASIC may be used.

In addition, among the processes illustrated in FIGS. 4 to 6, some processes may be omitted or changed within the scope without departing from independent claims of the claims. Furthermore, a configuration where an appropriate combination of features described in the above-described embodiments and above-described modified examples are embodied may be used.

What is claimed is:

1. A non-transitory computer readable storage medium storing a set of program instructions installed on and executed by an information processing device, the information processing device comprising: a display;
   a communication interface; and a controller; the program instructions, when executed by the controller, cause the information processing device to perform:
   acquiring first map data from a server through the communication interface, the first map data being indicative of a first map image, a first zoom level indicating a first scale of the first map image;
   displaying the first map image based on the first map data on the display;
   setting a print area to the first map image;
   determining a second zoom level on the basis of the first zoom level, the second zoom level indicating a second scale of a second map image, the second map image including at least the print area in the first map image;
   acquiring second map data from the server through the communication interface, the second map data being indicative of the second map image; and
   displaying the second map image on the display in response to acquisition of the second map data;
   wherein acquiring the second map data acquires a plurality of divided pieces of map data, a map area where the second map image is depicted being made up of a plurality of divided areas, the plurality of divided pieces of map data being assigned to respective ones of the plurality of divided areas, a zoom level of each of the plurality of divided pieces of map data being set to the second zoom level; and
   wherein the displaying the second map image generates the second map image by combining the plurality of divided pieces of map image, the plurality of divided pieces of map image corresponding to respective ones of the plurality of divided pieces of map data.

2. The non-transitory computer readable storage medium according to claim 1, wherein the acquiring the second map data acquires the second map data according to reference position information indicative of a reference position, the reference position being within the print area.

3. The non-transitory computer readable storage medium according to claim 1, wherein the second scale is larger than the first scale.

4. The non-transitory computer readable storage medium according to claim 3, wherein information amount of the second map image is greater than information amount of the first map image.

5. The non-transitory computer readable storage medium according to claim 1, wherein the determining determines the second zoom level on the basis of the first zoom level and a pixel ratio between a first pixel number and a second pixel number, the first pixel number being indicative of a number of pixels included in a predetermined direction of an effective area on the display, the second pixel number being indicative of a number of pixels included in the predetermined direction of the print area.

6. The non-transitory computer readable storage medium according to claim 5, wherein the determining determines the second zoom level by adding the first zoom level to a logarithm of an anti-log to a base, the anti-log being obtained by dividing the second pixel number by the first pixel number, the base being an integer greater than or equal to 2.

7. The non-transitory computer readable storage medium according to claim 5, wherein the second pixel number corresponds to printing settings including a paper size and printing resolution.

8. The non-transitory computer readable storage medium according to claim 1, wherein the display comprises a manipulation unit;
   wherein the program instructions, when executed by the controller, cause the information processing device to further perform:
   editing the second map image to create a third map image when an editing instruction is input through the manipulation unit, the editing instruction instructing editing the second map image, the third map image reflecting the editing instruction; and
   displaying the third map image on the display.

9. The non-transitory computer readable storage medium according to claim 1, wherein the acquiring the second map data acquires the plurality of divided pieces of map data, each of the plurality of divided pieces of map data being indicative of an area larger than the corresponding one of the plurality of divided areas.

10. The non-transitory computer readable storage medium according to claim 1, wherein the acquiring the second map data acquires one of the plurality of divided pieces of map data indicative of corresponding one of the plurality of divided areas and acquires next one of the plurality of divided pieces of map data indicative of next one of the plurality of divided areas adjacent to the corresponding one of the plurality of divided areas.

11. The non-transitory computer readable storage medium according to claim 1, wherein the information processing device further comprises a storage unit;
   wherein the program instructions, when executed by the controller, cause the information processing device to further perform:

generating a map image file of the second map image and storing the map image file in the storage unit; and wherein the displaying the second map image displays the second map image according to the map image file stored in the storage unit.

12. The non-transitory computer readable storage medium according to claim 1, wherein the display comprises a manipulation unit;

wherein the program instructions, when executed by the controller, cause the information processing device to further perform:

outputting the second map image;

wherein the displaying the second map image changes a display scale of the second map image when a scale changing instruction is input through the manipulation unit, the scale changing instruction instructing changing the display scale of the second map image;

wherein the displaying the second map image moves the second map image when a moving instruction is input through the manipulation unit, the moving instruction instructing moving the second map image; and wherein the outputting outputs the second map image without changing the print area regardless of whether the scale changing instruction or the moving instruction is input.

13. The non-transitory computer readable storage medium according to claim 1, wherein the program instructions, when executed by the controller, cause the information processing device to further perform: displaying a fourth map image before acquisition of the second map data is completed after the acquiring the second map data starts the acquiring, the fourth map image including a part of the second map image based on acquired map data.

14. The non-transitory computer readable storage medium according to claim 13, wherein the acquiring the second map data acquires a plurality of divided pieces of map data, a map area of the second map image being made up of a plurality of divided areas, the plurality of divided pieces of map data being indicative of respective ones of the plurality of divided areas, a zoom level of each of the plurality of divided pieces of map data being set to the second zoom level; and wherein the displaying the fourth map image displays the fourth map image including a part of one of the plurality of divided pieces of map image before acquisition of the one of the plurality of divided pieces of map data is completed after the acquiring second map data starts the acquiring the plurality of divided pieces of map data.

15. The non-transitory computer readable storage medium according to claim 1, wherein the information processing device further comprises a manipulation unit;

wherein the program instructions, when executed by the controller, cause the information processing device to further perform:

determining the first zoom level according to the first scale when a scale changing instruction is input through the manipulation unit, the scale changing instruction instructing changing the first scale;

determining the second zoom level on the basis of the first zoom level;

judging whether the second zoom level is larger than a maximum zoom level; and acquiring the first map data from the server through the communication interface in response to a determination that the second zoom level is not larger than the maximum zoom level;

wherein the displaying the first map image updates the first map image according to the acquired first map data in response to the determination that the second zoom level is not larger than the maximum zoom level; and wherein the displaying the first map image does not update the first map image in response to a determination that the second zoom level is larger than the maximum zoom level.

16. The non-transitory computer readable storage medium according to claim 1, wherein the display comprises a manipulation unit;

wherein the program instructions, when executed by the controller, cause the information processing device to further perform:

determining the first zoom level according to the first scale when a scale changing instruction is input through the manipulation unit, the scale changing instruction instructing changing the first scale;

determining the second zoom level on the basis of the first zoom level;

judging whether the second zoom level is larger than a maximum zoom level; and notifying a determination that the second zoom level is larger than the maximum zoom level in response to the determination.

17. The non-transitory computer readable storage medium according to claim 15, wherein the maximum zoom level is determined according to a map type of the first map image.

18. The non-transitory computer readable storage medium according to claim 1, wherein an aspect ratio of the first map image is equal to an aspect ratio of the print area.

19. The non-transitory computer readable storage medium according to claim 1, wherein the first map image is displayed on the display together with a margin image, the margin image masking a periphery of the print area in the first map image; and wherein the aspect ratio of the print area is changed by changing a size of the margin image.

20. A non-transitory computer readable storage medium storing a set of program instructions installed on and executed by an information processing device, the information processing device comprising: a display; a communication interface; and a controller; the program instructions, when executed by the controller, cause the information processing device to perform:

acquiring first map data from a server through the communication interface, the first map data being indicative of a first map image, a first zoom level indicating a first scale of the first map image;

displaying the first map image based on the first map data on the display;

setting a print area to the first map image;

determining a second zoom level on the basis of the first zoom level, the second zoom level indicating a second scale of a second map image, the second map image including at least the print area in the first map image;

acquiring second map data from the server through the communication interface, the second map data being indicative of the second map image; and displaying the second map image on the display in response to acquisition of the second map data.

wherein the display comprises a manipulation unit;

wherein the program instructions, when executed by the controller, cause the information processing device to further perform:

editing the second map image to create a third map image when an editing instruction is input through the manipulation unit, the editing instruction instructing editing the second map image, the third map image reflecting the editing instruction; and displaying the third map image on the display.

21. A non-transitory computer readable storage medium storing a set of program instructions installed on and executed by an information processing device, the information processing device comprising: a display; a communication interface; and a controller; the program instructions, when executed by the controller, cause the information processing device to perform:

acquiring first map data from a server through the communication interface, the first map data being indicative of a first map image, a first zoom level indicating a first scale of the first map image;

displaying the first map image based on the first map data on the display;

setting a print area to the first map image;

determining a second zoom level on the basis of the first zoom level, the second zoom level indicating a second scale of a second map image, the second map image including at least the print area in the first map image;

acquiring second map data from the server through the communication interface, the second map data being indicative of the second map image, wherein the information processing device further comprises a manipulation unit;

determining the first zoom level according to the first scale when a scale changing instruction is input through the manipulation unit, the scale changing instruction instructing changing the first scale;

determining the second zoom level on the basis of the first zoom level;

judging whether the second zoom level is larger than a maximum zoom level; and acquiring the first map data from the server through the communication interface in response to a determination that the second zoom level is not larger than the maximum zoom level;

wherein the displaying the first map image updates the first map image according to the acquired first map data in response to the determination that the second zoom level is not larger than the maximum zoom level; and wherein the displaying the first map image does not update the first map image in response to a determination that the second zoom level is larger than the maximum zoom level.

* * * * *